United States Patent
Rosenfield et al.

(10) Patent No.: US 8,606,816 B2
(45) Date of Patent: *Dec. 10, 2013

(54) MANAGEMENT OF COLLECTIONS OF WEBSITES

(75) Inventors: Zachary D. Rosenfield, Seattle, WA (US); William David Taylor, Redmond, WA (US); Titus C. Miron, Seattle, WA (US); Jason M. Cahill, Woodinville, WA (US); Umesh Unnikrishnan, Sammamish, WA (US); Harshal Ingole, San Jose, CA (US); Mark J. Walker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/281,196

(22) Filed: Oct. 25, 2011

(65) Prior Publication Data

US 2012/0042010 A1   Feb. 16, 2012

Related U.S. Application Data

(63) Continuation of application No. 12/049,311, filed on Mar. 15, 2008, now Pat. No. 8,065,327.

(51) Int. Cl.
*G06F 7/00* (2006.01)
*G06F 17/30* (2006.01)

(52) U.S. Cl.
CPC .. *G06F 7/00* (2013.01); *G06F 17/30* (2013.01)
USPC ............................. 707/781; 707/786; 707/802

(58) Field of Classification Search
None
See application file for complete search history.

(56) References Cited

U.S. PATENT DOCUMENTS

| | | | |
|---|---|---|---|
| 6,070,191 | A | 5/2000 | Narendran et al. |
| 6,317,786 | B1 | 11/2001 | Yamane et al. |
| 6,757,674 | B2 | 6/2004 | Wiens |
| 2002/0035584 | A1 | 3/2002 | Scheier et al. |
| 2002/0143906 | A1 | 10/2002 | Tormasov et al. |
| 2004/0054793 | A1 | 3/2004 | Coleman |
| 2004/0064501 | A1 | 4/2004 | Jan et al. |
| 2004/0111506 | A1 | 6/2004 | Kundu et al. |
| 2004/0162895 | A1 | 8/2004 | Mok et al. |
| 2004/0267871 | A1 | 12/2004 | Pratley et al. |

(Continued)

FOREIGN PATENT DOCUMENTS

EP   1359520 A1   11/2003

OTHER PUBLICATIONS

About Site Groups—SharePoint Portal Server 2003 IT Documentation http://office.microsoft.com/en-us/sharepointportaladmin/HA011911551033.aspx, printed Sep. 27, 2007, 2 pages.

(Continued)

*Primary Examiner* — Jay Morrison
(74) *Attorney, Agent, or Firm* — Merchant & Gould P.C.

(57) ABSTRACT

This disclosure describes techniques that enable a subscriber of a data center to manage a site collection group hosted by the data center. A site collection group is a set of site collections that belong to a single subscriber. A site collection is a collection of websites. A website is a collection of related resources. Each of the site collections is associated with an "owner". As described herein, the data center presents management interfaces that enable owners of site collections to manage the site collections. In addition, the data center presents management interfaces that enable subscribers to manage architectural aspects of their site collection groups.

20 Claims, 9 Drawing Sheets

(56) References Cited

U.S. PATENT DOCUMENTS

| | | | |
|---|---|---|---|
| 2005/0033751 | A1 | 2/2005 | Maron |
| 2005/0044197 | A1 | 2/2005 | Lai |
| 2005/0210012 | A1 | 9/2005 | Ding et al. |
| 2005/0283478 | A1 | 12/2005 | Choi et al. |
| 2006/0031849 | A1 | 2/2006 | Barta |
| 2006/0106748 | A1 | 5/2006 | Chafle et al. |
| 2006/0235935 | A1 | 10/2006 | Ng |
| 2007/0136579 | A1 | 6/2007 | Levy et al. |
| 2007/0156842 | A1 | 7/2007 | Vermeulen et al. |
| 2007/0168336 | A1 | 7/2007 | Ransil et al. |
| 2007/0203944 | A1 | 8/2007 | Batra et al. |
| 2008/0208926 | A1 | 8/2008 | Smoot et al. |
| 2009/0234858 | A1 | 9/2009 | Taylor |
| 2009/0234887 | A1 | 9/2009 | Rosenfield |

OTHER PUBLICATIONS

Finne, Albin, "Authorization System for Secure Group Applications based on Web Services", http://dsv.su.se/en/seclab/pages/pdf-files/2004-x-182.pdf, 64 pages.

Application Center 2000 at Microsoft—Managing the Availability of Microsoft's Web Properties, Microsoft TechNet, http://technet.microsoft.com/en-us/library/bb687314(d=printer).aspx, printed Sep. 27, 2007, 20 pages.

Chafle et al., "Decentralized Orchestration of Composite Web Services", May 17-22, 2004, pp. 134-143.

Kalantar et al., (Aug. 28-31, 2001), 7th International Euro-Par Conference, "Isolated Dynamic Clusters for Web Hosting", 2 page abstract.

Managing Site Groups and Permissions, Windows SharePoint Services 2003, http://www.microsoft.com/resources/documentation/wss/2/all/adminguide/en-us/stsf03.mspx?mfr=true, printed Sep. 27, 2007, 10 pages.

Shen, K. et al., (Dec. 2002), Proceedings of the 5th USENIX Symposium on Operating Systems Design and Implementation (OSDI'02), "Integrated Resource Management for Cluster-based Internet Services", 14 pgs.

U.S. Appl. No. 12/049,311, Amendment and Response filed Feb. 9, 2011, 15 pgs.

U.S. Appl. No. 12/049,311, Amendment and Response filed Jun. 22, 2011, 14 pgs.

U.S. Appl. No. 12/049,311, Amendment and Response filed Aug. 24, 2010, 14 pgs.

U.S. Appl. No. 12/049,311, Final Office Action mailed Nov. 9, 2010, 21 pgs.

U.S. Appl. No. 12/049,311, Notice of Allowance mailed Jul. 12, 2011, 5 pgs.

U.S. Appl. No. 12/049,311, Office Action mailed Mar. 22, 2011, 21 pgs.

U.S. Appl. No. 12/049,311, Office Action mailed May 24, 2010, 15 pgs.

U.S. Appl. No. 12/049,311, Supplemental Amendment and Response filed Feb. 23, 2011, 7 pgs.

U.S. Appl. No. 12/049,284, Amendment and Response filed Feb. 28, 2011, 14 pgs.

U.S. Appl. No. 12/049,284, Amendment and Response filed Aug. 18, 2010, 14 pgs.

U.S. Appl. No. 12/049,284, Office Action mailed May 18, 2010, 12 pgs.

U.S. Appl. No. 12/049,284, Office Action mailed Oct. 28, 2010, 23 pgs.

MANAGEMENT OF COLLECTIONS OF WEBSITES

CROSS-REFERENCE TO RELATED APPLICATIONS

This application is a continuation of and claims benefit to U.S. patent application Ser. No. 12/049,311, (now U.S. Pat. No. 8,065,327), entitled "MANAGEMENT OF COLLECTIONS OF WEBSITES," filed on Mar. 15, 2008, which application is incorporated herein by reference in its entirety.

BACKGROUND

Web pages are important means for communication and collaboration for enterprises. An enterprise may use web pages to communicate with its employees, with the public, with its partners, and with other groups. An enterprise may organize web pages targeted to different audiences into groups of web pages known as "websites". For instance, an enterprise may organize a set of web pages targeted to its employees into an intranet website. Furthermore, in this instance, the enterprise may organize a set of web pages targeted to the public into an Internet website.

In order to provide web pages, an enterprise may establish its own information technology infrastructure. Establishing an information technology infrastructure may require the purchase of one or more servers that provide the web pages and may require the purchase of bandwidth from a network access provider. In addition, the enterprise may be required to hire employees to administer the information technology infrastructure.

Expenses associated with establishing and maintaining the information technology infrastructure may be considerable. For instance, high-end servers may cost several thousand dollars each. Furthermore, the salary of a network administrator hired to configure and maintain the information technology infrastructure may be several thousand dollars per month.

In order to reduce expenses associated with establishing and maintaining its own information technology infrastructure, an enterprise may enter a subscription agreement with an operator of a data center. A data center is a collection of servers and other network appliances that operate to perform network services on behalf of one or more subscribers. The subscription agreement may specify that, in exchange for a periodic fee, the operator of the data center will provide a web hosting service that hosts a website of the enterprise.

The operator of the data center may make many such subscription agreements with many different enterprises, organizations, or individuals. Enterprises, organizations, and individuals that enter subscription agreements with an operator of a data center for network services are referred to as "subscribers" or "tenants."

In some circumstances, it is not necessary for a data center to include a server that is exclusively dedicated to providing web hosting services on behalf of a single subscriber. For example, a website of a first subscriber may not receive enough hits from client devices to justify the expense of maintaining a separate server to operate a web hosting service that exclusively hosts the website of the first subscriber. In such circumstances, a single server in the data center may provide a shared web hosting service that hosts the websites of a plurality of subscribers. When a single server provides a shared web hosting service that hosts the websites of a plurality of subscribers, the data center may endeavor to ensure that it appears to each of the subscribers that the data center has provided a dedicated server that provides a web hosting service that exclusively hosts the subscribers' individual websites. In other words, the data center tries not to give any indication to a subscriber that a server that provides the web hosting service for the subscriber is also providing web hosting services for other subscribers.

In some instances, a subscriber of a data center may use the data center to host several separate websites. For instance, a subscriber may operate a plurality of different e-commerce enterprises, each of which has its own website. In another example, a subscriber may operate an intranet site that is accessible to employees of the subscriber and an extranet website that is accessible to a group of employees of the subscriber and a group of employees of a partner enterprise.

SUMMARY

This disclosure describes techniques that enable a subscriber of a data center to manage a site collection group hosted by the data center. A site collection group is a set of site collections that belong to a single subscriber. A site collection is a collection of websites. A website is a collection of related resources. Each of the site collections is associated with an "owner". As described herein, the data center presents management interfaces that enable owners of site collections to manage the site collections. In addition, the data center presents management interfaces that enable subscribers to manage architectural aspects of their site collection groups.

For instance, a data center hosting company may own and operate a data center. The data center hosting company manages the hardware of the data center and settings that affect the data center as a whole. A "retailer" may enter a wholesale subscription agreement with the data center hosting company that obligates the data center hosting company to host a site collection group for the retailer. Hosting a site collection group comprises providing data storage space, bandwidth, basic network services, and site collection group administration interface. Subsequently, the retailer may create helper services that are customized for a specific type of business. For example, the retailer may create helper services that are customized for family-practice dental offices.

A "consumer" may enter a retail subscription agreement with the retailer that obligates the retailer to host a site collection for the consumer. Hosting a site collection comprises providing data storage space, bandwidth, basic web hosting services, customized helper services, and a site collection management interface. When a consumer enters such a retail subscription agreement with the retailer, the retailer may use the site collection group management interface to create a new site collection within the retailer's site collection group.

The consumer can use the site collection management interface of a site collection to manage the site collection. For instance, an administrator for the consumer may use the site collection management interface to create an Internet website that is available to the general public and an "intranet" website that is available only to employees of the consumer. Furthermore, the administrator for the consumer may use the site collection management interface to manage resources in the Internet website and the intranet website. One or more of the resources may utilize the customized helper services provided by the retailer. The consumer may then make one or more of these websites accessible to the public or other groups.

Managing site collection groups in this way may be advantageous because the retailer can create custom helper services for specific types of businesses. This enables the operator of a data center to remain focused on its core competency of maintaining a data center without having to design helper services for different types of businesses. Furthermore, the techniques of this disclosure enable consumers to remain focused on their own businesses without having to understand and construct the helper services that support their websites. Consequently, the operator of the data center and the consumers may operate their businesses more efficiently.

The techniques described in this disclosure may be realized in many ways. For example, the techniques may be realized as a method that comprises hosting, at a data center, a site collection group that includes a plurality of site collections. At least one of the site collections within the site collection group includes a plurality of websites. In addition, the method comprises providing a site collection group management interface that enables a first entity to manage architectural aspects of the site collection group. Furthermore, the method comprises providing a site collection management interface that enables a second entity to manage a first site collection. The first site collection is one of the site collections within the site collection group.

In another example, the techniques described in this disclosure may be realized as a computer-readable medium comprising instructions that cause a server that executes the instructions to maintain a content database that stores a plurality of site collection groups. Each of the site collection groups includes a plurality of site collections, wherein each of the site collections in each of the site collection groups includes at least one website. The instructions also cause the server to execute an instance of a web application that receives, from client devices, client requests associated with resources in at least one of the site collection groups and, in response to each of the client requests, processes the client requests. The instance of the web application cannot use data that is specific to a first one of the site collections to process a request associated with a resource in a second one of the site collections without permission from an owner of the first one of the site collections. In addition, the instructions cause the server to provide a site collection group management interface that enables a first entity to manage architectural aspects of a first one of the site collection groups. Furthermore, the instructions cause the server to provide a site collection management interface that enables a second entity to manage a first site collection. The first site collection is one of the site collections within the first one of the site collection groups.

In another example, the techniques described in this disclosure may be realized as a server that comprises a content database that stores resources in a plurality of site collections. The server also comprises a configuration database that includes: (i) data that indicate a site collection group associated with each of the site collections; and (ii) data that indicate a tier of helper services associated with each of the site collection groups. In addition the server also comprises a processor that executes an instance of a web application that: (a) receives a request associated with a resource in a first one of the site collections; (b) determines whether the first one of the site collections is associated with the tier of helper services; (c) uses a first helper service in the tier of helper services to process the request; (d) provides a site collection group management interface that enables a first entity to manage architectural aspects of a first one of the site collection groups; and (e) provides a site collection management interface that enables a second entity to manage content aspects of the first one of the site collections. The processor also executes a process that provides the first helper service. The process that provides the first helper service cannot use data that is specific to a second one of the site collections to process the request without permission from an owner of the second one of the site collections.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 is a screen diagram that shows a site collection management page of a site collection group management interface.

FIG. 9 is a screen diagram that shows a site settings page in a site collection management interface.

DETAILED DESCRIPTION

Figure 1:
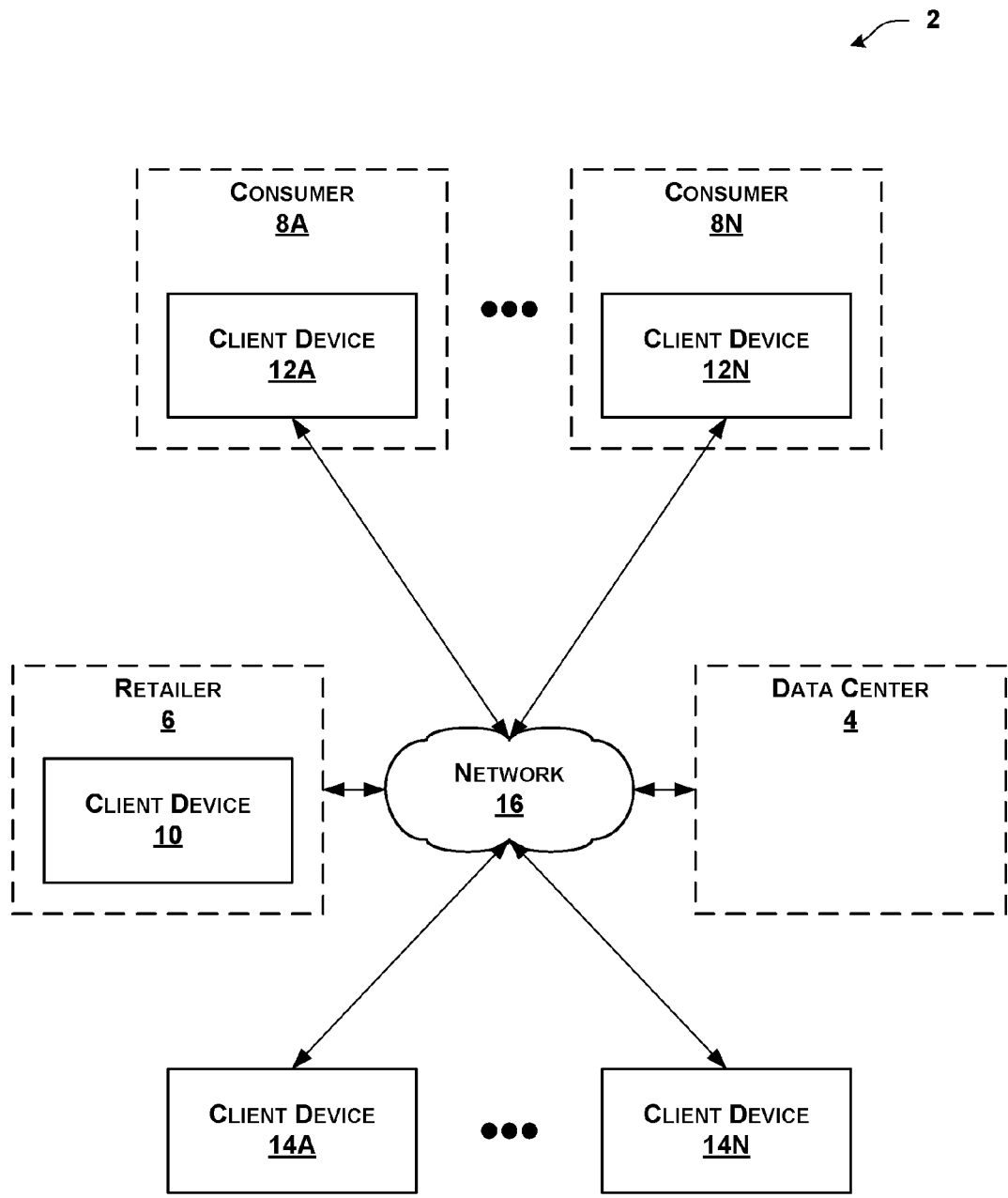
FIG. 1 is a block diagram illustrating an example system in which a data center provides web hosting services to a plurality of subscribers.

FIG. 1 is a block diagram illustrating an example system 2 in which a data center 4 provides web hosting services to a plurality of subscribers. It should be appreciated that FIG. 1 is provided for explanatory purposes only and is not meant to be construed as the only possible implementation of the techniques of this disclosure. Rather, system 2 in FIG. 1 only represents one implementation among many possible implementations.

A retailer 6 may enter a wholesale subscription agreement with an operator of data center 4 that obligates the operator of data center 4 to host a site collection group for retailer 6. A site collection group is a set of site collections and a site collection is a set of websites. A website is a set of web-accessible resources including static web pages, active server pages, word processor documents, Portable Document Format (PDF) documents, Common Gateway Interface (CGI) scripts, media files, and other types of web-accessible resources. In many cases, the wholesale subscription agreement may obligate retailer 6 to pay a monthly service fee in exchange for the data center operator's promise to host the site collection group. When retailer 6 enters a wholesale subscription agreement with an operator of data center 4 that obligates the operator of data center 4 to host a site collection group for retailer 6, retailer 6 is a "subscriber of the data center."

Although not illustrated in the example of FIG. 1, many retailers may enter wholesale subscription agreements with the operator of data center 4. Consequently, the operator of data center 4 may be obligated to host many different site collection groups. Furthermore, a single retailer may enter multiple wholesale subscription agreements with the operator of data center 4, thereby obligating the operator of data center 4 to host multiple site collection groups for the retailer.

As illustrated in the example of FIG. 1, system 2 includes a set of consumers 8A-8N (collectively, "consumers 8"). Retailer 6 and consumers 8 may be a wide variety of different types of entities. For example, retailer 6 and consumers 8 may be enterprises, individuals, governmental agencies, non-profit organizations, educational institutions, or other types of entities that consist of one or more people. Furthermore, one or more of consumers 8 may be a group of two or more of the previously mentioned types of entities. For ease of explanation, the remainder of this disclosure refers to consumer 8A instead of consumers 8 as a group. It should be understood that, unless otherwise indicated, any reference to consumer 8A may be equally applicable to any of consumers 8.

Retailer 6 includes a client device 10 and consumers 8A through 8N include respective ones of client devices 12A-12N (collectively, "client devices 12"). Furthermore, in the example of FIG. 1, system 2 includes a set of client devices 14A-14N (collectively, "client devices 14"). Client devices 14 may used by members of the public, employees of consumer 8A, or members of other entities. Client device 10, client devices 12, and client devices 14 may be examples of many different types of devices. For instance, one or more of client device 10, client devices 12, and client devices 14 may be personal computers, mobile telephones, portable handheld devices, mainframe computers, tablet computers, laptop computers, web kiosks, or other types of devices.

In the example of FIG. 1, a network 16 facilitates communication between client device 10, client devices 12, client devices 14, and data center 4. Network 16 may be any of a wide variety of different types of network that facilitate communication between client device 10, client devices 12, client devices 14, and data center 4. For instance, network 16 may be a local area network, a wide area network (e.g., the Internet), a global area network, a metropolitan area network, or another type of network. Network 16 may include many network devices and many network links. The network devices in network 16 may include bridges, hubs, switches, firewalls, routers, load balancers, and other types of network devices. The network links in network 16 may include wired links (e.g., coaxial cable, fiber optic cable, 10BASE-T cable, 100BASE-TX cable, etc.) and may include wireless links (e.g., WiFi links, WiMax links, wireless broadband links, mobile telephone links, Bluetooth links, infrared links, etc.).

Data center 4 may include one or more network devices that individually or in collaboration operate to provide web hosting services. The network devices included in data center 4 may be located within a single facility. Alternatively, the network devices included in data center 4 may be distributed among a plurality of facilities located at different geographic locations. For instance, one of the network devices included in data center 4 may be located in a facility in Korea and another network device included in data center 4 may be located in a facility in France.

Retailer 6 uses client device 10 to communicate, via network 16, with data center 4. For ease of explanation, when this disclosure states that retailer 6 communicates with data center 4, this statement may be read to mean that retailer 6 uses client device 10 to communicate with data center 4. Similarly, consumers 8 use client devices 12 to communicate, via network 16, with data center 4. For ease of explanation, when this disclosure states that one of consumers 8 communicates with data center 4, this statement may be read to mean that the consumer uses one of client devices 12 to communicate with data center 4.

As mentioned above, retailer 6 may enter a wholesale subscription agreement with data center 4 that obligates the operator of data center 4 to host a site collection group for retailer 6. Hosting a site collection group comprises providing data storage space for the site collection group, providing bandwidth to transfer data associated with the site collection group, providing basic network services, and providing a site collection group management interface. The site collection group management interface enables retailer 6 to manage architectural aspects of the site collection group. Example architectural aspects of a site collection group include, but are not limited to, the number of site collections in the site collection group, helper services available for use to process client requests for resources in websites in site collections of the site collection group, data storage quotas for the site collections of the site collection group, site collection group management permissions, and other aspects of the site collection group that do not relate to the resources of websites in the site collections of the site collection group.

The site collection group management interface may be implemented in a variety of ways. For example, the site collection group management interface for a site collection group may be implemented as a website within the site collection group that includes web pages having features that enable retailer 6 to manage the architectural aspects of the site collection group. In a second example, the site collection group management interface may be implemented as a set of computer functions that retailer 6 remotely invokes to manage architectural aspects of a site collection group. In a third example, the site collection group management interface may be implemented as a command-line interface.

Retailer 6 may create custom suites of helper service applications. A "helper service application" is a software application that, when executed by a computer, causes the computer to provide a helper service that enables data center 4 to provide specialized functionality. For example, a first helper service application may enable a server that executes an instance of the first helper service application to provide an indexing service that creates an index of information contained in web pages in websites and uses the index to process search requests for information contained in the websites. In a second example, a second helper service application may enable a server that executes an instance of the second helper service application to provide an e-mail forwarding service. In a third example, a third helper service application may enable a server that executes an instance of the third helper service application to provide a helper service that enables interaction with an insurance company. In this third example, the helper service may be useful to small dental or medical offices that could use the helper service to send reimbursement requests to the insurance company. Other example types of helper service applications may enable servers in data center 4 to provide blog management services, wiki services, media distribution services, and so on.

After creating a custom suite of helper service applications, retailer 6 may make an arrangement with the operator of data center 4 that obligates data center 4 to execute the helper service applications in the custom suite of helper service applications. When executed by data center 4, the custom suite of helper service applications enable servers in data center 4 to provide a suite of custom helper services. Retailer 6 may then market the suite of custom helper services to potential consumers, such as consumers 8. Retailer 6 may categorize custom suites of helper services into tiers of services. For instance, retailer 6 may categorize helper services "A" and "B" into a basic tier of helper services, helper services "A", "B", and "C" into a standard tier of helper services, and helper services "A", "B", "C", and "D" into a deluxe set of helper services. Retailer 6 may associate a different fee with each of the tiers of helper services.

To illustrate how custom suites of helper services may be used, consider the following example. In this example, retailer 6 may create a suite of custom helper service applications that enable servers in data center 4 to provide helper services useful to the dental practice industry. For instance, a first one of the custom helper services may be an insurance company interaction service, a second one of the custom helper services may be an automated patient billing service, a third one of the custom helper services may be an automatic appointment reminder service, and so on. Retailer 6 may attempt to convince dental offices to host their websites with retailer 6 because, unlike competitors of retailer 6, retailer 6 is able to provide a suite of helper services that is specially-tailored to the dental industry.

Consumer 8A may select a tier of helper services offered by retailer 6 and enter a retail subscription agreement with retailer 6. The retail subscription agreement obligates retailer 6 to virtually host a site collection for consumer 8A. Virtually hosting a site collection comprises providing data storage space for the site collection, bandwidth to transfer data associated with the site collection, basic network services, services in the selected tier of services, and a site collection management interface that enables consumer 8A to manage the site collection. The retail subscription agreement may also obligate consumer 8A to pay the fee associated with the tier of helper services to retailer 6 on a periodic (e.g., monthly) basis.

After consumer 8A enters the retail subscription agreement with retailer 6, retailer 6 may use the site collection group management interface provided by data center 4 to create a new site collection within the site collection group belonging to retailer 6. When retailer 6 creates a new site collection within the site collection group, retailer 6 allocates some of the site collection group's data storage space to the new site collection. For example, the operator of data center 4 may use data center management interface to allocate 500 gigabytes of data storage space to the site collection group. In this example, retailer 6 may allocate 100 of these 500 gigabytes to the new site collection. In addition, retailer 6 allocates some of the site collection group's bandwidth to the new site collection. Furthermore, retailer 6 uses the site collection group management interface to associate specific custom services with the new site collection. Retailer 6 may also use the site collection group management interface to perform a variety of other site collection group management tasks when retailer 6 creates the new site collection.

Once retailer 6 has created the site collection for consumer 8A, consumer 8A may use a site collection management interface to manage the site collection. The site collection management interface may be, for example, a set of one or more static or dynamically-generated web pages that include features (e.g., forms, input fields, media, text, etc.) that enable a consumer to manage content in all of the websites in each of the site collections associated with the consumer.

Consumer 8A may use the site collection management interface to establish one or more websites within the site collection. Each of the websites within a site collection typically has a specific intended purpose. In a first example, consumer 8A may establish a first website with the intent to use the first website as an intranet site that includes web pages that are accessible only to employees of consumer 8A. Furthermore, in this example, consumer 8A may establish a second website with the intent to use the second website as an Internet site that includes web pages that are accessible to members of the general public. In a second example, consumer 8B may establish a first website with the intent of using the first website to market a first type of product to the general public and may establish a second website to market a second type of product to the general public.

Furthermore, consumer 8A may use the site collection management interface to associate each of the websites within a site collection with different domain names. A "domain name" is a name that identifies a computer on the Internet. For example, consumer 8A may associate the first website with the domain name "intranet.contoso.com" and may associate the second website with the domain name "www.contoso.com". In a second example, consumer 8A may associate a first website with the domain name "www.kitchenslicer.com" and may associate a second website in the site collection with the domain name "www.tidychopper.com".

Consumer 8A may use the site collection management interface of a site collection to create resources that use the helper services associated with the site collection. For example, consumer 8A may enter a retail subscriber agreement with retailer 6 that obligates retailer 6 to associate an insurance company interaction helper service with a site collection owned by consumer 8A. In this example, consumer 8A may subsequently use the site collection management interface of the site collection to create a web page in a website in the site collection that submits reimbursement data to the insurance company. In another example, consumer 8A may enter a retail subscriber agreement with retailer 6 that obligates retailer 6 to associate an indexing/search helper service with a site collection owned by consumer 8A. In this example, consumer 8A may use the site collection management interface of the site collection to create a search page that enables users of the search page to search for web pages that contain certain information in one or more of the websites in the site collection.

Consumer 8A may use the site collection management interface of a site collection to establish and modify settings in the settings data store for the site collection. When retailer 6 creates the site collection for consumer 8A, data center 4 may create a settings data store for the site collection. A settings data store for a site collection includes data that describes settings that are general to the site collection. As described below, the settings in the settings data store may serve a wide variety of purposes and may cause data center 4 to perform a wide variety of actions. The settings in the settings data store may affect one or more of the websites in the site collection. For example, the settings in the settings data store may include a rule that specifies that blog posts entered in a webpage of a public website in the site collection are automatically posted in a webpage in a private website in the site collection.

After consumer 8A has created resources in the websites of a site collection, consumer 8A may make the resources available on network 16. Client devices 14 may then access resources in the websites hosted by data center 4. When one of client devices 14 requests a resource in a website hosted by data center 4, the client device may send, via network 16, a request that specifies a Uniform Resource Locator (URL) of the resource to data center 4. In response to the request, data center 4 may utilize one or more of the services associated with the website to process the request for the resource.

Retailer 6 may virtually host more than one site collection for a single one of consumers 8. There may be many reasons why one of consumers 8 may want retailer 6 to virtually host more than one site collection for the consumer. For example, a publicly-accessible website belonging to consumer 8A may use a first set of helper services and a private website belonging to consumer 8A may use a second set of helper services. In this example, it may be more cost-effective for consumer 8A to employ two separate site collections because of the rates for the helper services. In another example, it may be more efficient to administer site collections separately.

Although FIG. 1 has been explained in the context of a retailer and consumers, it should be appreciated that the techniques of this disclosure are not limited to this context. For example, the information technology (IT) department of a large enterprise may act in place of the retailer and other departments of the enterprise may act in place of the consumers. That is, in this example, the IT department could use the site collection group management interface to create department-specific site collections within the site collection group.

Figure 2:
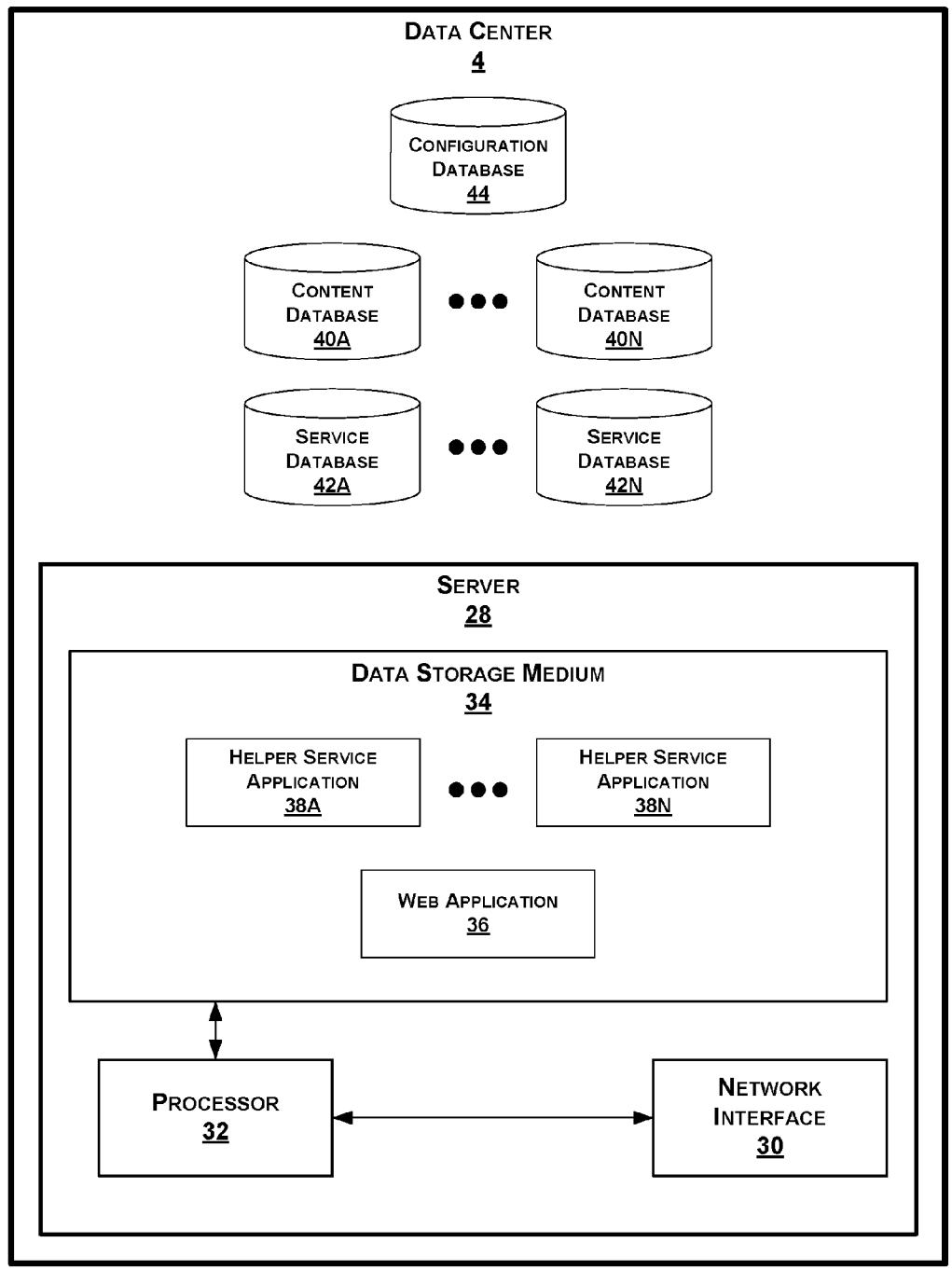
FIG. 2 is a block diagram illustrating example details of the data center.

FIG. 2 is a block diagram illustrating example details of data center 4 (FIG. 1). As illustrated in the example of FIG. 2, data center 4 includes a server 28. Server 28 may be a wide variety of different types of devices. For example, server 28 may be a standalone server, a blade server, or another type of server.

As illustrated in the example of FIG. 2, server 28 includes a network interface 30. Network interface 30 may be a wide variety of different types of network interface. For example, network interface 30 may be an Ethernet interface, a fiber optic network interface, a WiFi interface, a WiMax interface, or another type of network interface. Although not illustrated in the example of FIG. 2, server 28 may include a plurality of network interfaces.

Server 28 also includes a processor 32 that is capable of executing software instructions. Processor 32 may be one or more general purpose microprocessors (e.g., an Itanium processor manufactured by Intel Corporation of Santa Clara, Calif.), digital signal processors, application-specific integrated circuits, or other types of integrated circuits that are capable of executing software instructions. Although not illustrated in the example of FIG. 2, server 28 may include a plurality of processors that are capable of executing software instructions.

Server 28 also includes a data storage medium 34. Data storage medium 34 may comprise one or more data storage media that belong to a variety of different types of data storage media. For instance, data storage medium 34 may comprise one or more random access memory (RAM) modules, magnetic disks, optical discs, floppy disks, magnetic tapes, holographic memory units, and other types of data storage media. Data storage medium 34 may be implemented using one or more data storage media that are removable from server 28.

As illustrated in the example of FIG. 2, data storage medium 34 includes a web application 36. Web application 36 includes a set of instructions that, when executed by processor 32, cause server 28 to execute a set of one or more processes that provide a web hosting service that processes requests for resources in one or more site collection groups. For example, web application 36 may cause server 28 to provide a web hosting service that processes all Hyper Text Transfer Protocol (HTTP) requests received by server 28 for resources in one or more site collection groups.

Processor 32 may execute more than one instance of web application 36. For example, processor 32 may execute a first instance of web application 36 and a second instance of web application 36. In this example, the first instance of web application 36 may process requests for resources in a first site collection group and requests for resources in a second site collection group and the second instance of web application 36 may process requests for resources in a third site collection group.

In the example of FIG. 2, data storage medium 34 also includes a set of helper service applications 38A through 38N (collectively, "helper service applications 38"). Each of helper service applications 38 is a set of instructions that, when executed by processor 32, cause server 28 to provide a helper service. Each helper service may be a process that provides shared data, computation, aggregation, or modification behaviors. One or more of helper service applications 38 may be custom helper service applications created by retailer 6.

Processor 32 may execute a single instance of each of helper service applications 38, thereby causing server 28 to provide each of the helper services. An instance of web application 36 may use the helper services to process requests related to resources in site collection groups associated with the instance of web application 38. In other words, processor 32 does not execute a separate instance of a helper service application for each instance of web application 36, for each site collection group, for each site collection, or for each website hosted by data center 4. For this reason, the helper services may be described as "shared" services. It may be advantageous to use a single instance of each of helper service applications 38 as opposed to separate instances of each of helper service application 38 for each instance of web application 36, site collection group, site collection, or website. This is because the separate instances of helper service applications 38 may consume significant amounts of computational resources of server 28, resulting in poor performance.

Helper service applications 38 may, when executed by processor 32, cause server 28 to provide a wide variety of different helper services. For instance, one of service applications 38 may be a fee assessment service application. As described above, individual ones of consumers 8 may make retail subscription agreements with retailer 6 that obligate retailer 6 to provide various tiers of helper services in exchange for fees. The fee assessment service application may comprise a set of instructions that, when executed by processor 32, cause server 28 to charge fees associated with tiers of helper services to ones of consumers 8 that are associated with the tiers of helper services that data center 4 provides for the subscribers.

In another example, helper service applications 38 may include a site collection management helper service application that, when executed by processor 32, causes server 28 to provide a custom site collection management service. When the instance of web application 36 receives a request related to a site collection management interface for a particular site collection, the instance of web application 36 may use the custom site collection management service to process the request. Because each retailer that uses data center 4 may create a different site collection management helper service application, each retailer can create customized site collection management interfaces.

As illustrated in the example of FIG. 2, data center 4 includes service databases 42A-42N (collectively, "service databases 42"). Service databases 42 may store data associated with the helper services. For example, one of the helper services may be a search service. In this example, the search service may generate an index for each website in each site collection of a site collection group. In this example, the search service may store the index in service databases 42.

When the helper services store data in service databases 42, the helper services may store data that is specific to individual site collections in different partitions of service databases 42. For instance, the search service of the previous example may store an index for websites in a first site collection in a first partition of service databases 42 and may store an index for websites in a second site collection in a second partition of service databases 42.

When one of the helper services processes a request associated with a first site collection, the helper service is only permitted to use data in partitions of service databases 42 that are associated with the first site collection. Because the helper service is only permitted to use data in partitions of service databases 42 that are associated with the first site collection when processing a request associated with the first site collection, the helper service prevents an owner of a second site collection from learning data in the partitions of service databases 42 that are associated with the first site collection. For example, when the search service of the previous examples processes a search request associated with the first site collection, the search service only uses the index in the partition of service databases 42 that is associated with the first site collection. In other words, when the search service processes the search request associated with the first site collection, the search service does not use the index in the partition of service databases 42 that is associated with the second site collection.

In the example of FIG. 2, data center 4 also comprises content databases 40A through 40N (collectively, "content databases 40"). Each of content databases 40 is a database that stores content of one or more site collections. Content databases 40 may be a wide variety of different types of databases. For instance, one or more of content databases 40 may be a relational database, an associative database, an object-oriented database, a post-relational database, a file system, a SQL database, or another structure for organizing data. Furthermore, content databases 40 may store a settings data store for each site collection group and site collection.

Furthermore, in the example of FIG. 2, data center 4 includes a configuration database 44. Configuration database 44 may store configuration properties for each site collection hosted by data center 4. Configuration database 44 may store a wide variety of configuration properties for each site collection hosted by data center 4. In a first example, configuration database 44 may store, for each site collection hosted by data center 4, a configuration property that specifies a site collection group associated with the site collection. In a second example, configuration database 44 may store, for each site collection hosted by data center 4, a configuration property that specifies an "owner" of the site collection. In a third example, configuration database 44 may store, for each site collection hosted by data center 4, a configuration property that specifies a set of users who have administrative rights to the site collection.

Configuration database 44 may also store configuration properties for each site collection group hosted by data center 4. Configuration database 44 may store a wide variety of configuration properties for each site collection group hosted by data center 4. In a first example, configuration database 44 may store, for each site collection group hosted by data center 4, a configuration property that specifies a set of helper services associated with all site collections in the site collection group. In a second example, configuration database 44 may store, for each site collection group hosted by data center 4, a configuration property that specifies a set of users who have administrative rights to the site collection group.

Figure 3:
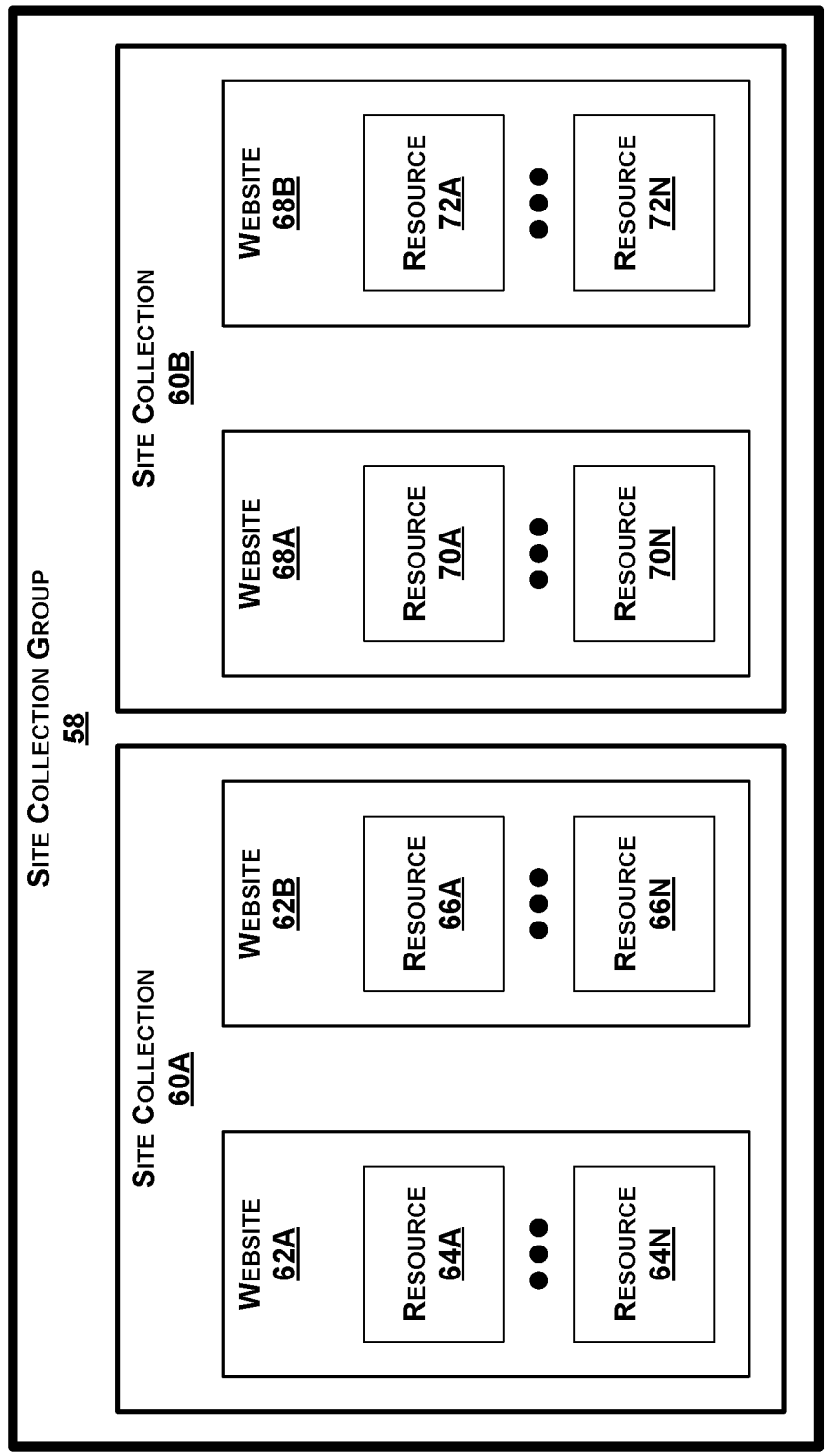
FIG. 3 is a block diagram illustrating an example site collection group.

FIG. 3 is a block diagram illustrating an example site collection group 58. As illustrated in the example of FIG. 3, site collection group 58 includes a site collection 60A and a site collection 60B. Site collection 60A comprises a website 62A and a website 62B. Website 62A includes resources 64A-64N (collectively, "resources 64"). Similarly, website 62B includes resources 66A-66N (collectively, "resources 66"). Site collection 60B comprises a website 68A and a website 68B. Website 68A includes resources 70A-70N (collectively, "resources 70"). Website 68B includes resources 72A-72N (collectively, "resources 72").

Resources 64, resources 66, resources 70, and resources 72 may be a wide variety of resources including static resources such as Hypertext Markup Language (HTML) files, PDF documents, media files, word processor documents, spreadsheets, and other types of static resources. In addition, resources 64, resources 66, resources 70, and resources 72 may include scripts that dynamically generate web pages.

It should be appreciated that site collection group 58 is only one example site collection group. Other valid site collection groups may include more or fewer site collections. Moreover, other valid site collections may include more or fewer websites than site collections 60A and 60B.

Figure 4:
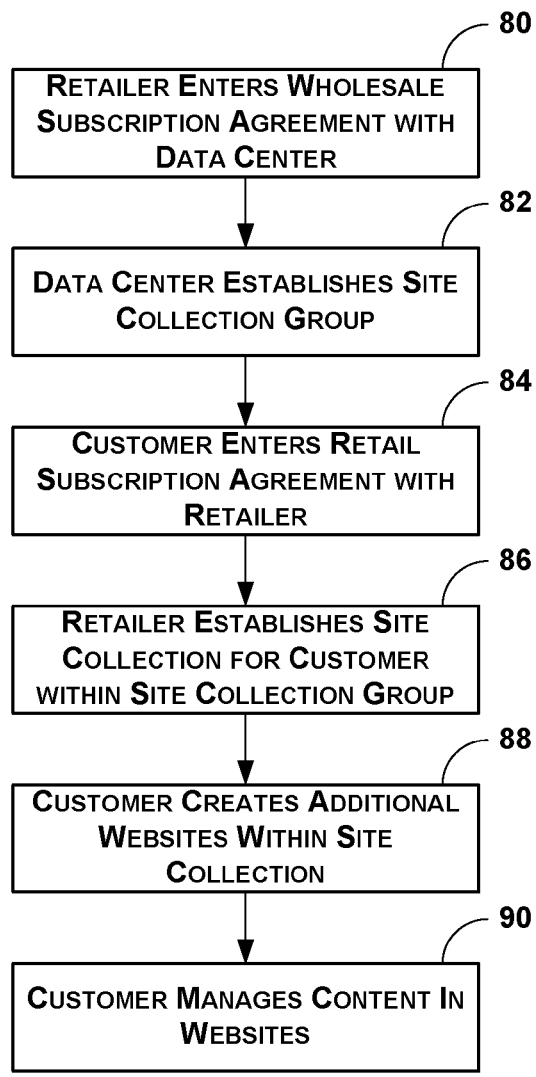
FIG. 4 is a flowchart illustrating an example sequence of actions that may be performed to establish and manage websites in a site collection.

FIG. 4 is a flowchart illustrating an example sequence of actions to establish and manage websites in a site collection. Initially, retailer 6 enters a wholesale subscription agreement with an operator of data center 4 (80). The wholesale subscription agreement may obligate the operator of data center 4 to host a site collection group belonging to retailer 6. As discussed above, hosting a site collection group may comprise providing data storage space for the site collection group, providing bandwidth to transfer data related to the site collection group, providing basic web hosting services, and providing a site collection group management interface for the site collection group. The wholesale subscription agreement may also obligate the operator of data center 4 to provide one or more custom helper services created by retailer 6. In addition, the wholesale subscription agreement may obligate retailer 6 to pay a subscription fee to the operator of data center 4 on a periodic basis. After retailer 6 enters the wholesale subscription agreement with the operator of data center 4, the operator of data center 4 may use a data center management interface to establish a site collection group (82).

Subsequently, a consumer (e.g., consumer 8A) may enter a retail subscription agreement with retailer 6 (84). The retail subscription agreement obligates retailer 6 to virtually host a site collection belonging to consumer 8A. As discussed above, virtually hosting a site collection may comprise providing data storage space for the site collection, providing bandwidth to transfer data related to the site collection, providing basic web hosting services, providing custom helper services, and providing a site collection management interface for the site collection.

When consumer 8A enters the retail subscription agreement with retailer 6, retailer 6 may use the site collection group management interface to create a site collection for consumer 8A within the site collection group (86). Initially, the site collection may, by default, contain a single website. Consumer 8A may use this initial website for a variety of purposes. For instance, consumer 8A may use this initial website as an intranet site for use exclusively by employees of consumer 8A.

Once retailer 6 has established the site collection, consumer 8A may use the site collection management interface of the site collection to create additional websites in the site collection (88). For example, consumer 8A may use the site collection management interface to create a second website within the site collection. In this example, the second website in the site collection may be an extranet site for use by employees of consumer 8A and employees of an enterprise that is cooperating with consumer 8A.

After consumer 8A has created one or more websites in the site collection, consumer 8A may use the site collection management interface of the site collection to manage the websites in the site collection (90). As described above, consumer 8A may use the site collection management interface to manage the websites in the site collection in a variety of ways including adding resources, deleting resources, editing resources, editing user access rights to resources, and so on.

Figure 5:
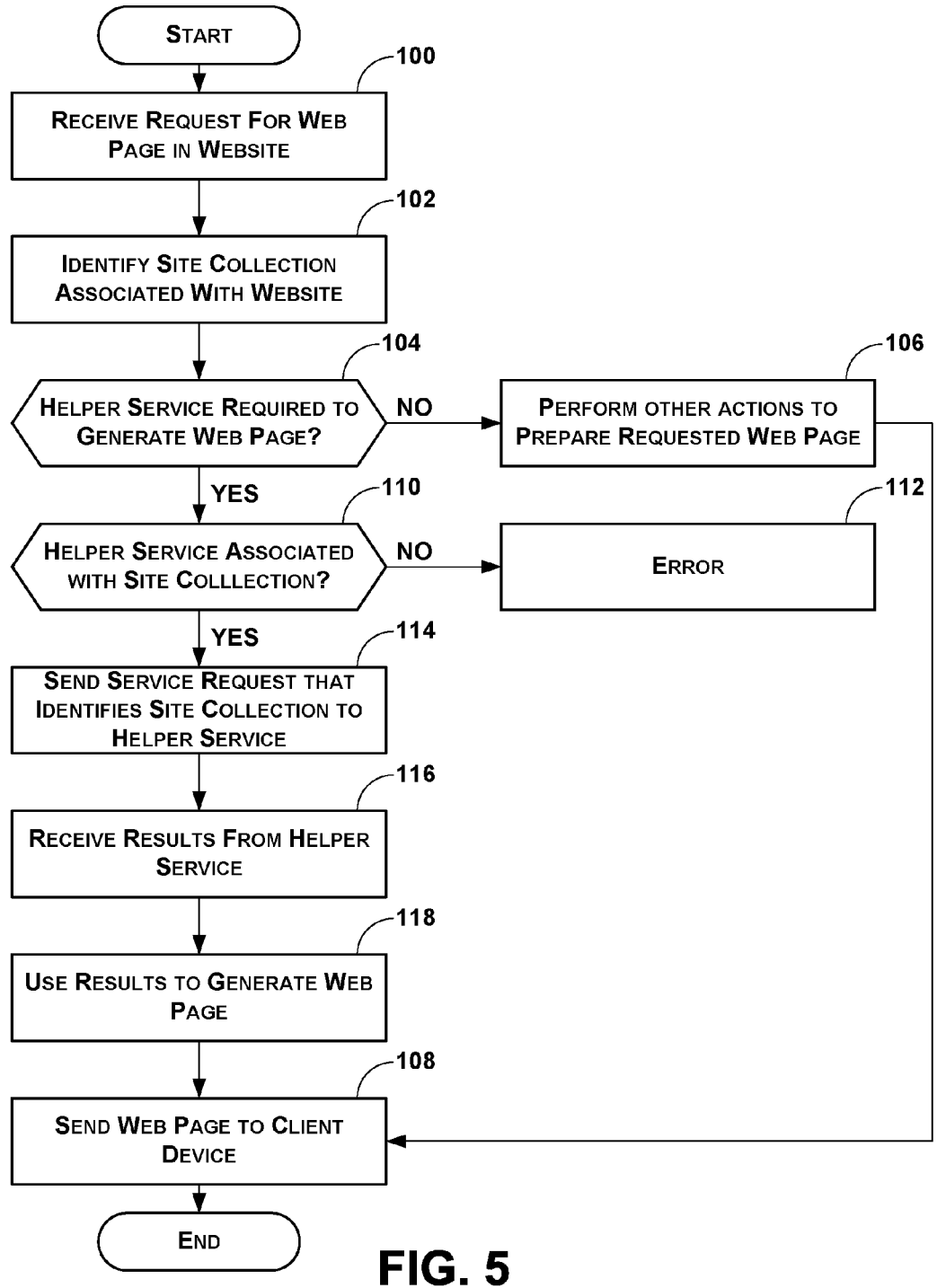
FIG. 5 is a flowchart illustrating an example operation of an instance of a web application.

FIG. 5 is a flowchart illustrating an example operation of an instance of web application 36 when the instance of web application 36 receives a request to retrieve a web page. FIG. 5 is provided for explanatory purposes only and it not intended to represent a sole operation performed by an instance of web application 36. Rather, an instance of web application 36 may perform many alternative operations.

As illustrated in the example of FIG. 5, the operation may begin when the instance of web application 36 receives, from one of client devices 14, a request for a web page in a website associated with the instance of web application 36 (100). For instance, the instance of web application 36 may receive a HTTP "GET" request that specifies a domain name of a website associated with the instance of web application 36.

When the instance of web application 36 receives the request for the web page in the website, the instance of web application 36 may identify a site collection associated with the website (102). The instance of web application 36 may identify the site collection associated with the website in a variety of ways. For instance, the instance of web application 36 may access a table in configuration database 44 that specifies associations between websites and site collections.

After the instance of web application 36 identifies the site collection associated with the website, the instance of web application 36 may determine whether the instance of web application 36 requires a helper service to process the request to retrieve the web page (104). For example, when the instance of web application 36 receives the request to retrieve the web page, the instance of web application 36 may invoke a function of the helper service. Server 28 may provide the helper service when server 28 executes one of helper service applications 38 (FIG. 2).

If the instance of web application 36 determines that the instance of web application 36 does not require a helper service to process the request ("NO" of 104), the instance of web application 36 may perform one or more other actions to prepare the requested web page for delivery to the requesting one of client devices 14 (106). For instance, when the instance of web application 36 receives, from client device 14A, a HTTP "GET" request for a specific web page stored in one of content databases 40, the instance of web application 36 may retrieve the web page from one of content databases 40. After preparing the requested web page for delivery to the requesting one of client devices 14, the instance of web application 36 may send the requested web page to the requesting one of client devices 14 (108).

On the other hand, if the instance of web application 36 determines that the instance of web application 36 requires the helper service to process the request ("YES" of 104), the instance of web application 36 may determine whether the helper service is associated with the identified site collection (110). The instance of web application 36 may determine whether the helper service is associated with the site collection in a variety of ways. For instance, the instance of web application 36 may access a table in configuration database 44 that specifies each of the services associated with the identified site collection. If the instance of web application 36 determines that the helper service is not associated with the identified site collection ("NO" of 110), the instance of web application 36 may output an error (112). The instance of web application 36 may output the error because the instance of web application 36 is unable to generate the requested web page without the helper service.

However, if the instance of web application 36 determines that the helper service is associated with the identified site collection ("YES" of 110), the instance of web application 36 may send a service request to the helper service (114). The service request may specify the identified site collection. The service request may specify the identified site collection in order to inform the helper service that the request is being made in order to generate a web page in a website in the site collection. This may be important when the helper service is being used to generate web pages in websites in different site collections because the helper service may use sensitive data that is specific to specific site collections. For example, the helper service may use patient data associated with a site collection associated with a dental office. For security reasons, the helper service is only permitted to use data that is specific to the site collection identified in the service request.

In some circumstances, a customer associated with another site collection may allow the helper service to use site-specific data of the other site collection to provide the helper service for a site collection identified in the service request. For example, consumer 8A may be associated with a first site collection and consumer 8B may be associated with a second site collection. In this example, the helper service may be an indexing/search service that generates a first searchable index to the websites in the first site collection and a second searchable index to the websites in the second site collection. The first searchable index is data that is specific to the first site collection and the second searchable index is data that is specific to the second site collection. In general, the indexing/search service should not use the second searchable index when performing a search that the instance of web application 36 will use to generate a search results web page in a website in the first site collection. However, consumer 8A and consumer 8B may want to allow the indexing/search service to use the second searchable index when performing a search that the instance of web application 36 will use to generate a search results web page in a website in the first site collection. In this way, the indexing/search service may identify web pages in websites in both the first site collection and the second site collection.

After the instance of web application 36 sends the service request to the helper service, the instance of web application 36 may receive results from the helper service (116). For example, when the helper service is the index/search service, the instance of web application 36 may receive a list of web pages that contain information described by a particular search string that was included in the request for the web page sent by the requesting one of client devices 14. It should be appreciated that not all helper services provide results to the instance of web application 36. For instance, the helper service may simply be a service that stores data into a database.

When the instance of web application 36 receives the results from the helper service, the instance of web application 36 may use the results to generate the requested web page (118). For instance, the results may be a list of web pages that contain information described by the search string. In this instance, the instance of web application 36 may format the list of web pages into an HTML document. After the instance of web application 36 generates the requested web page, the instance of web application 36 may send the web page to the requesting one of client devices 14 (108).

Figure 6:
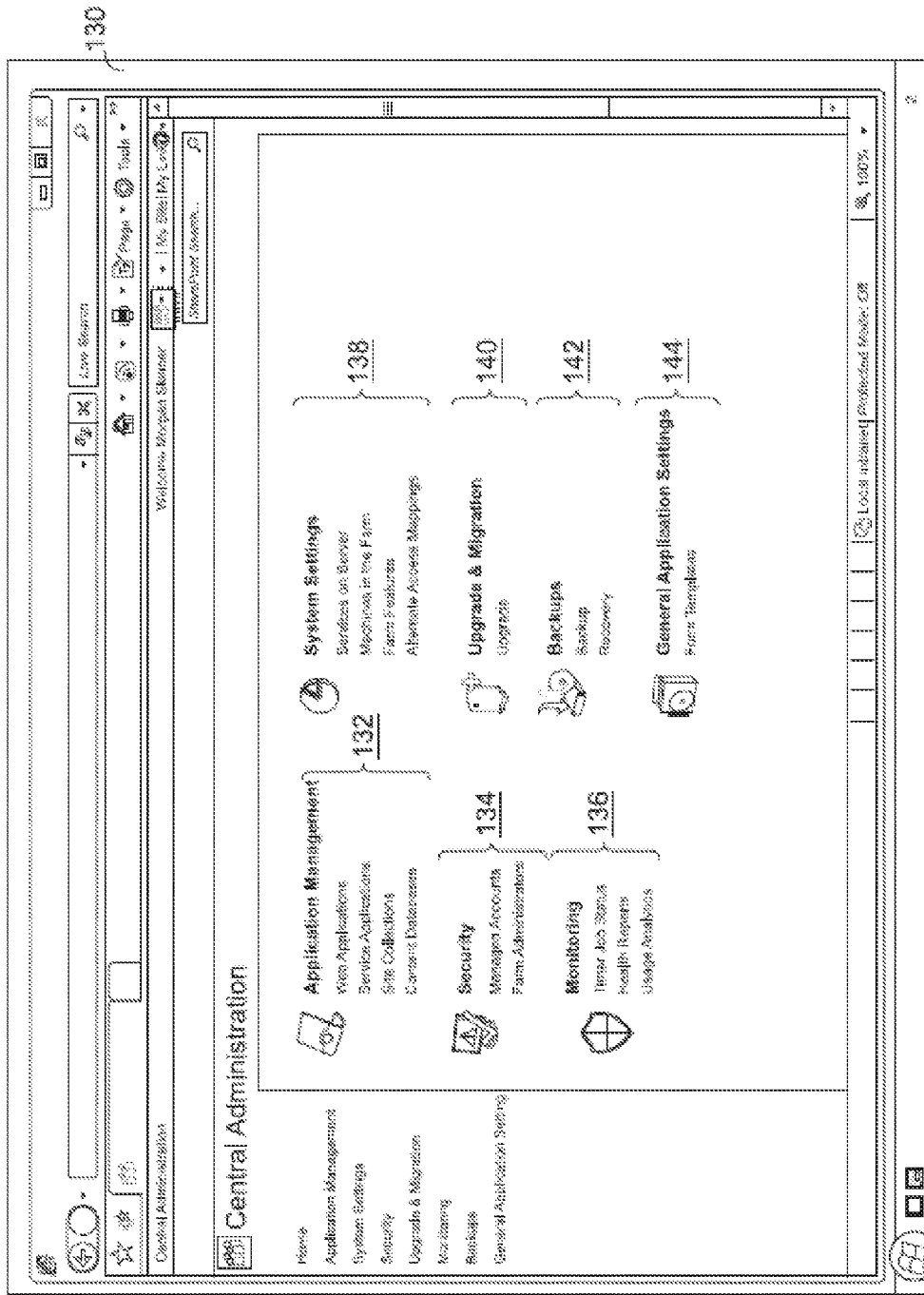
FIG. 6 is a screen diagram that shows a central administration page of a data center management interface.

FIG. 6 is a screen diagram that shows a central administration page 130 of a data center management interface. Central administration page 130 includes various features that allow an operator of data center 4 to manage data center 4. As illustrated in the example of FIG. 6, central administration page 130 includes links 132 to pages of the data center management interface that allow the operator to manage web applications, service applications, site collections, and content databases. In addition, central administration page 130 includes links 134 to pages of the data center management interface that allow the operator to manage the security of data center 4. Central administration page 130 also includes links 136 to pages of the data center management interface that allow the operator to monitor aspects of data center 4 including job timer statuses, health reports, and usage analytics.

Furthermore, central administration page 130 includes links 138 to pages of the data center management interface that allow the operator to manage the system settings of data center 4. As illustrated in the example of FIG. 6, links 138 take the operator to pages that enable the operator to configure services on servers, configure machines in the farm (i.e., data center), configure farm features, and manage alternate access mappings.

Central administration page 130 also includes a link 140 to an upgrade page of the data center management interface. Links 142 in central administration page 130 take the operator to pages of the data center administration interface that allow the operator to back up data in data center 4 and recover data. In addition, central administration page 130 includes a link 144 to a page of the data center administration interface that enables the operator to manage form templates.

Figure 7:
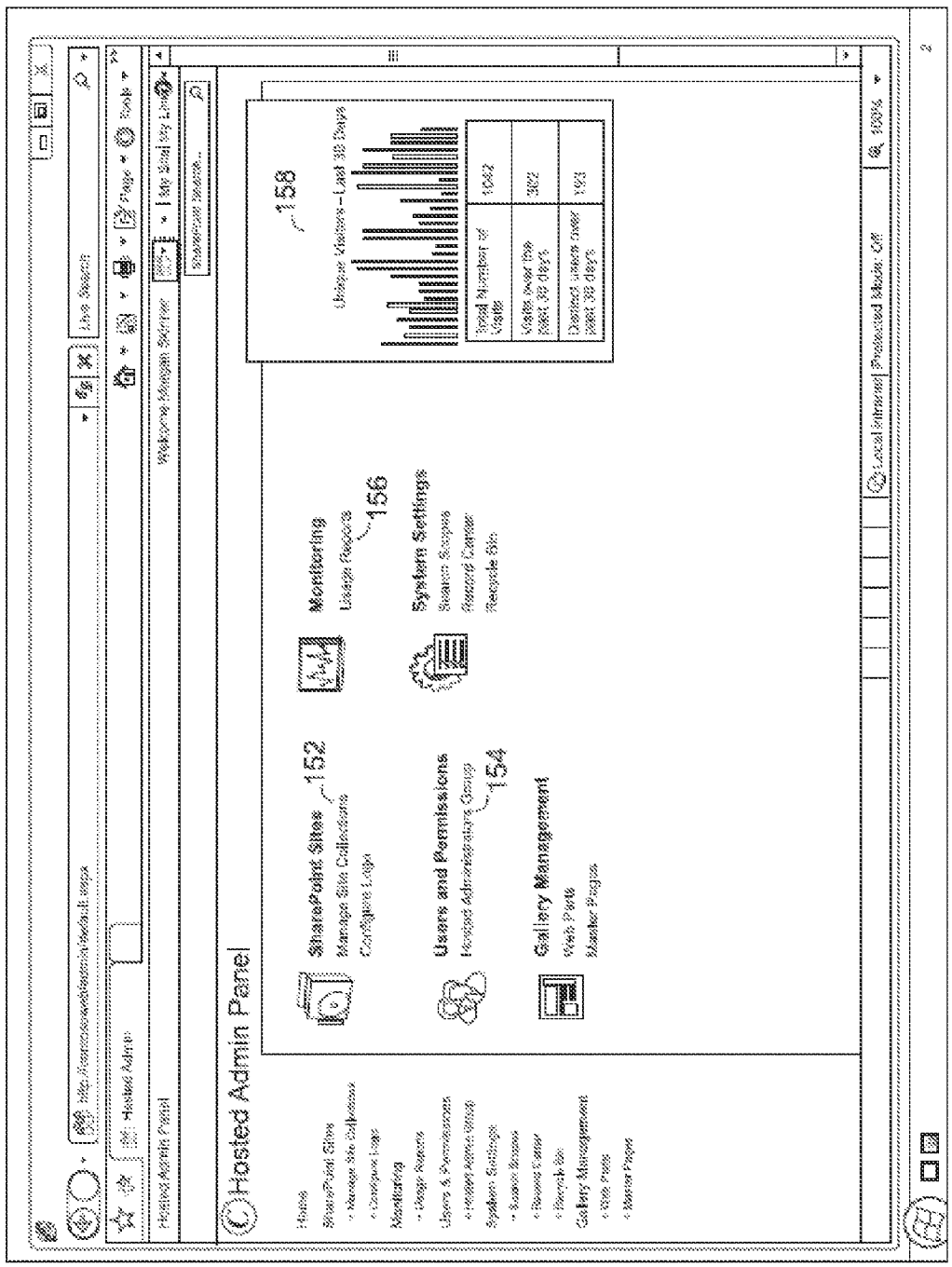
FIG. 7 is a screen diagram that shows a hosted admin panel page of a site collection group management interface.

FIG. 7 is a screen diagram that shows a hosted admin panel page 150 of a site collection group management interface. As illustrated in the example of FIG. 7, page 150 includes a link 152 to a page of the site collection group management interface that allows retailer 6 to manage site collections in the site collection group. In addition, page 150 includes a link 154 to a page of the site collection group management interface that allows retailer 6 to manage users who can manage the site collection group.

Page 150 also includes a link 156 to a page of the site collection group management interface that allows retailer 6 to view and create usage reports regarding the site collection group. Furthermore, page 150 includes a chart 158 that illustrates the number of unique visitors to web pages in the site collection group during the last 30 days.

Figure 8:
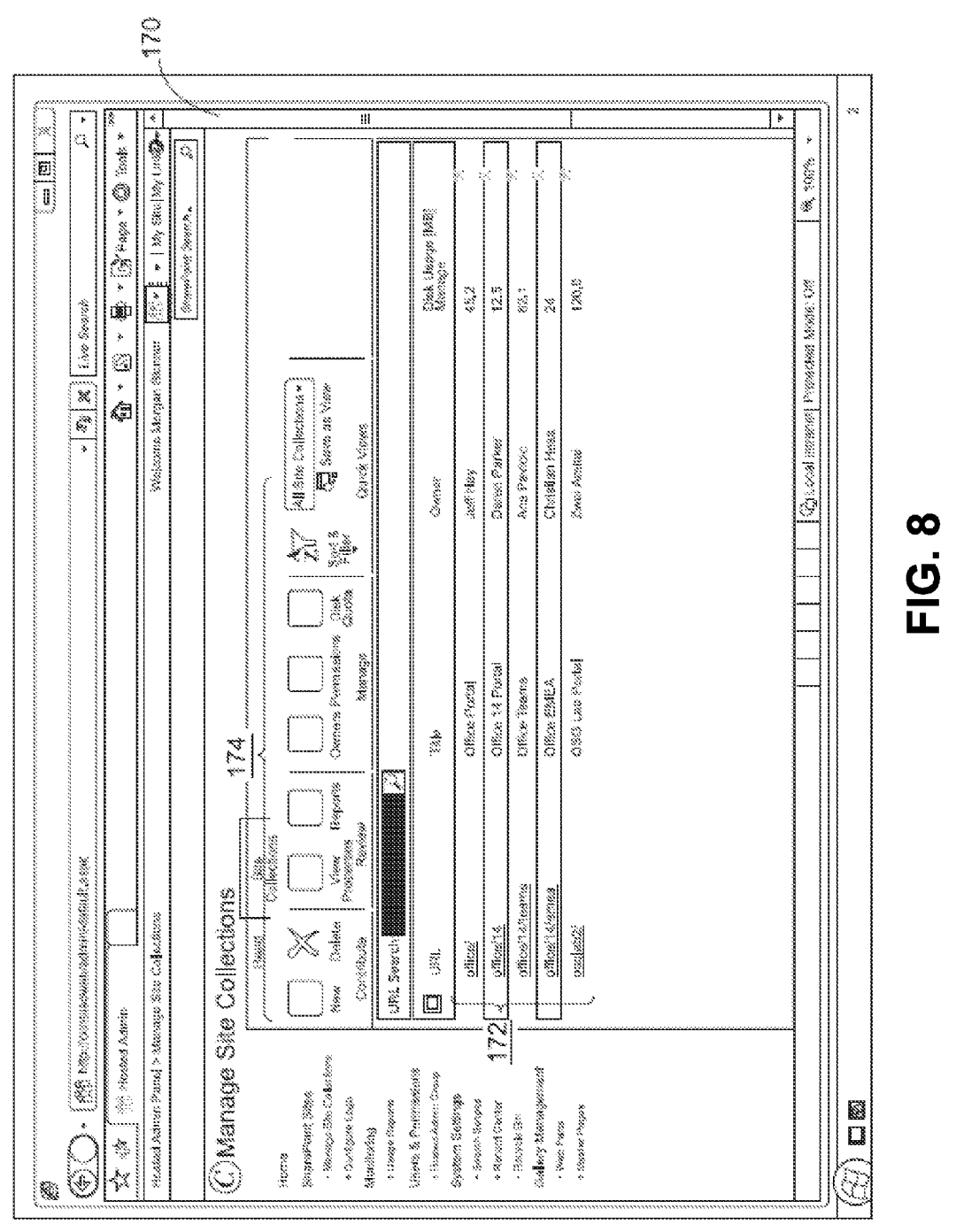

FIG. 8 is a screen diagram that shows a site collection management page 170 of a site collection group management interface. Page 170 may be accessed by selecting link 152 in page 150. As illustrated in the example of FIG. 8, page 170 includes a list 172 of site collections within a site collection group. In addition, page 170 includes a set of features 174 that enable retailer 6 to create a new site collection, to delete a site collection, to view properties of a site collection, view reports on a site collection, set the owners of a site collection, set permissions for a site collection, and set a disk quota for a site collection.

Figure 9:
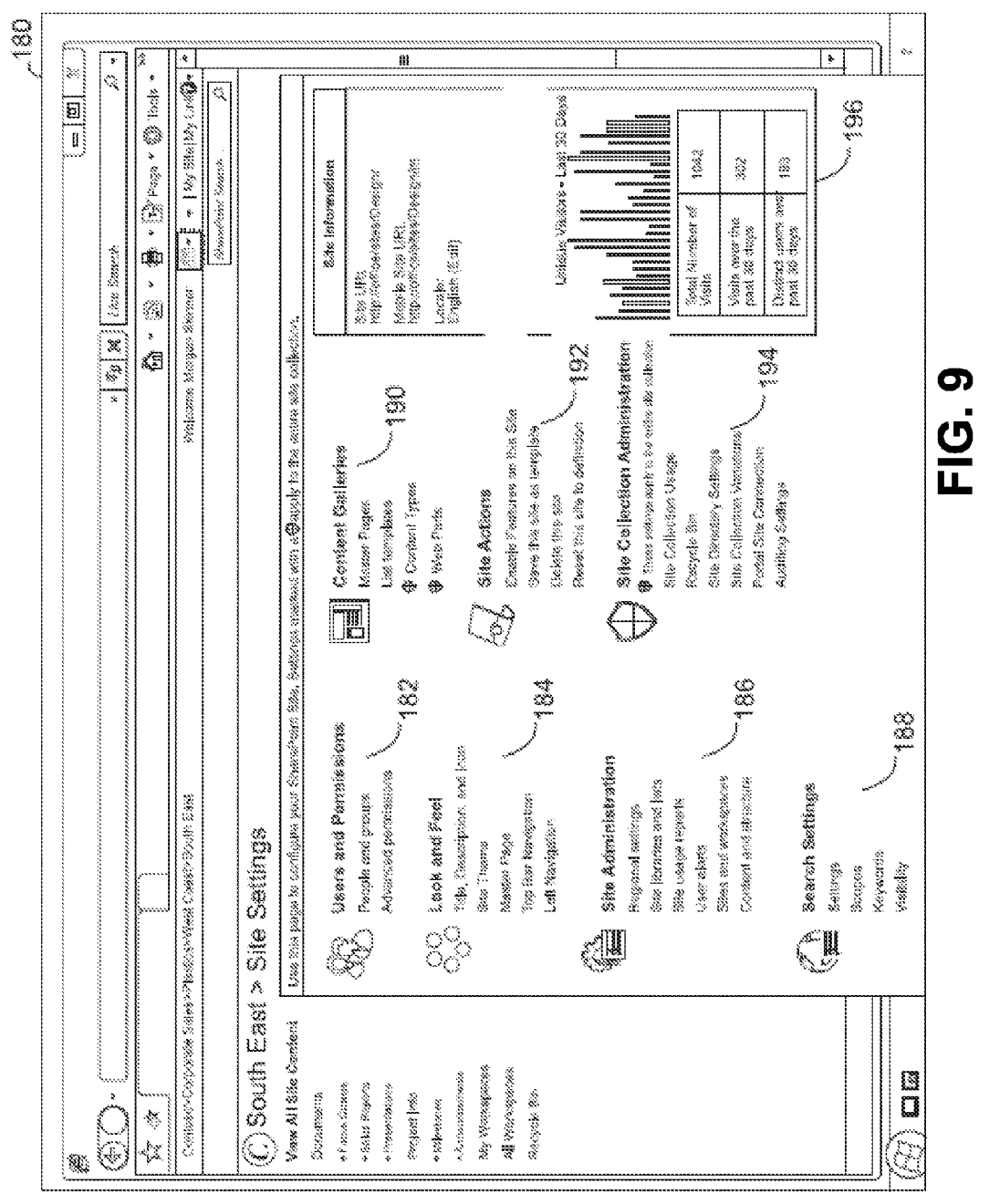

FIG. 9 is a screen diagram that shows a site settings page 180 of a site collection management interface. Site settings page 180 includes various features that allow a consumer to manage content aspects of a site collection. As illustrated in the example of FIG. 9, site settings page 180 includes links 182 to pages of the site collection management interface that enable the consumer to control users and permissions. For instance, the consumer may use these pages of the site collection management interface to specify that a first website in the site collection is publicly accessible and to specify that a second website in the site collection is accessible only to employees of the consumer.

Site settings page 180 also includes links 184 to pages of the site collection management interface that enable the subscriber to control the look and feel of web pages in a website in the site collection. Furthermore, site settings page 180 includes links 186 to pages of the site collection management interface that enable the consumer to perform general site administration tasks for the website. For example, the consumer may use these pages of the site collection management interface to delete or edit content in each of the websites in the site collection.

Site settings page 180 also includes links 188 to pages of the site collection management interface that enable the consumer to configure search settings for the website. Furthermore, site settings page 180 includes links 190 to content galleries that include templates for creating content in the webpage. In addition, site settings page 180 includes links 192 to pages of the site collection management interface to enable the consumer to perform site actions on the website. The site actions may include enabling features on the website, saving the website as a template, deleting the website, and resetting the website.

Site settings page 180 also includes links 194 to pages of the site collection management interface that enable the consumer to perform site collection administration tasks. As shown in the example of FIG. 9, links 194 include a link to a site collection usage page, a link to a site collection recycle bin, a link to a site directory settings page, a link to a site collection variations page, a link to a portal site connection page, and a link to an auditing settings page. The site collection usage page may include statistics about the usage of resources in each of the websites in the site collection. For instance, the information may specify how much storage space the resources of the websites in the site collection are occupying, how many resources are in each of the websites in the site collection, how many hits each of the resources in each of the websites in the site collection has received, how fast the resources of the websites in the site collection are growing or shrinking, and other types of information that may be helpful in managing the site collection.

Site settings page 180 also includes a feature 196 that shows statistics about the content of the website. As shown in the example of FIG. 9, feature 196 displays a chart that shows the number of unique visitors to the website over the last thirty days.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes and instructions may be stored in computer-readable media and executed by processors. The memory unit may be implemented within the processor or external to the processor, in which case it can be communicatively coupled to the processor via various means as is known in the art.

Various embodiments have been described. These and other embodiments are within the scope of the following claims.

We claim:

1. A method comprising:
hosting, at a server, a site collection group that includes a plurality of site collections, wherein at least one of the site collections within the site collection group includes a plurality of websites;
receiving a request to associate, with each site collection of the plurality of site collections, a suite of one or more helper services tailored to each site collection, wherein a first suite of one or more helper services provides specialized functionality to a first site collection, and wherein at least one of the one or more helper services in the first suite of helper services comprises: blog management or wiki services;
providing a site collection group management interface that enables a first entity to manage architectural aspects of the site collection group, the site collection group management interface having features enabling the entity to manage the architectural aspects; and
providing a site collection management interface that enables a second entity to manage the first site collection, wherein the first site collection is one of the site collections within the site collection group.

2. The method of claim 1, wherein hosting the site collection group comprises executing, at the data center, an instance of a web application that receives, from client devices, client requests associated with resources in the site collection group and processes the client requests.

3. The method of claim 2,
wherein the method further comprises:
executing, at the data center, a process that provides a helper service; and
maintaining, at the data center, a configuration database that stores data that indicates whether the helper service is associated with the first site collection; and
wherein executing the process that provides the web application service comprises:
using the data stored in the configuration database to determine whether the helper service is associated with the first site collection; and
utilizing the helper service to process the client requests when it is determined that the helper service is associated with the first site collection.

4. The method of claim 3,
wherein the method further comprises storing in the configuration database data that indicates whether the helper service is associated with the site collection group; and
wherein executing the process that provides the web application service further comprises:
using the data stored in the configuration database to determine whether the helper service is associated with the site collection group; and
utilizing the helper service to process the client requests when it is determined that the helper service is associated with the site collection group.

5. The method of claim 3,
wherein the method further comprises maintaining a service database that stores service data associated with the helper service, and
wherein executing the process that provides the helper service comprises:
receiving, at the helper service, a request associated with the first site collection; and
exclusively using portions of the service data that are in a partition of the service database associated with the first site collection to respond to the request.

6. The method of claim 3,
wherein the helper service is a member of a first tier of helper services that are designed for a first type of business by at least one entity other than an operator of the data center;
wherein the method further comprises executing, at the data center, processes that provide helper services in a second tier of helper services that are designed for a second type of business by at least one entity other than the operator of the data center;
wherein executing the process that provides the web application service comprises:
using the data stored in the configuration database to determine whether the first site collection is associated with the first tier of helper services or the second tier of helper services;
utilizing a helper service in the first tier of helper services when it is determined that the first site collection is associated with the first tier of helper services; and
utilizing a helper service in the second tier of helper services when it is determined that the first site collection is associated with the second tier of helper services.

7. The method of claim 3, wherein providing the site collection group management interface comprises:
in response to the request from the first entity to associate the first site collection with the helper service, updating the data in the configuration database to indicate that the helper service is associated with the first site collection.

8. The method of claim 2,
wherein the site collection group is a first site collection group;
wherein the web application service receives, from the client devices, client requests associated with resources in a second site collection group and processes the client requests associated with resources in the second site collection group;
wherein the second site collection group includes a plurality of site collections, each of which includes at least one website;
wherein the method further comprises:
enabling a third entity to utilize a site collection group management interface to manage architectural aspects of the second site collection group, and
enabling a fourth entity to utilize a site collection management interface to manage a second site collection, wherein the second site collection is one of the site collections within the second site collection group.

9. The method of claim 1, wherein providing the site collection group management interface comprises:
receiving, via the site collection group management interface, a request from the first entity to create a second site collection within the site collection group; and
in response to the request from the first entity to create the second site collection, creating the second site collection within the site collection group.

10. The method of claim 1, wherein providing the site collection group management interface comprises:

receiving, via the site collection group management interface, a request from the first entity to set a data storage quota for the first site collection; and in response to the request from the first entity to set the data storage quota for the first site collection, enforcing the data storage quota for the first site collection.

11. The method of claim 1, wherein providing the site collection group management interface comprises providing a website that comprises the site collection group management interface; and wherein providing the site collection management interface comprises providing a website that comprises the site collection management interface.

12. The method of claim 1, wherein providing the site collection management interface comprises:

receiving, via the site collection management interface, a request from the second entity to create a web page in one of the websites in the first site collection;

in response to the request from the second entity to create the web page, creating the web page in the first site collection;

receiving, via the site collection management interface, a request from the second entity to establish a setting that is applicable to all of the websites in the first site collection; and in response to receiving the request from the second entity to establish a setting that is applicable to all of the websites in the first site collection, applying the setting to all of the websites in the first site collection.

13. The method of claim 1, wherein the method further comprises:

creating the site collection group when an operator of the data center enters a wholesale subscription agreement with the first entity that obligates the operator of the data center to host the site collection group for the first entity; and receiving, via the site collection group management interface, a request to create the first site collection when the first entity enters a retail subscription agreement with the second entity that obligates the first entity to host the first site collection for the second entity.

14. The method of claim 1, wherein each of the websites in the site collection are associated with different domain names.

15. A computer-readable medium comprising instructions that cause a server that executes the instructions to:

maintain a content database that stores a plurality of site collection groups, wherein each of the site collection groups includes a plurality of site collections, wherein each of the site collections in each of the site collection groups includes at least one website, and wherein a suite of one or more helper service applications tailored to each site collection is associated with each site collection, wherein a first suite of one or more helper service applications provides specialized functionality to a first site collection, and wherein at least one of the one or more helper service applications in the first suite of helper service applications comprises: blog management or wiki services;

execute an instance of a web application that receives, from client devices, client requests associated with resources in at least one of the site collection groups and, in response to each of the client requests, processes the client requests; wherein the instance of the web application cannot use data that is specific to a first one of the site collections to process a request associated with a resource in a second one of the site collections without permission from an owner of the first one of the site collections;

provide a site collection group management interface that enables a first entity to manage architectural aspects of a first one of the site collection groups, wherein the site collection group management interface is implemented as a website within the first one of the site collection groups, the website including web pages having features enabling the first entity to manage the architectural aspects; and provide a site collection management interface that enables a second entity to manage a first site collection, wherein the first site collection is one of the site collections within the first one of the site collection groups, and wherein the one or more helper service applications are tailored to the second entity.

16. The computer-readable medium of claim 15, wherein the instructions further cause the server to:

execute, at the data center, a process that provides a helper service application; and maintain, at the data center, a configuration database that stores data that indicates whether the helper service application is associated with the first site collection; and wherein the instructions that cause the server to execute the instance of the web application comprise instructions that cause the server to:

use the data stored in the configuration database to determine whether the helper service application is associated with the first site collection; and utilize the helper service application to process the client requests when it is determined that the helper service application is associated with the first site collection.

17. The computer-readable medium of claim 16, wherein the instructions further cause the server to further maintain a service database that stores service data associated with the helper service application; and wherein the instructions that cause the server to execute the process that provides the helper service application comprise instructions that cause the server to:

receive, at the helper service, a request associated with the first site collection; and exclusively use portions of the service data that are in a partition of the service database associated with the second entity to respond to the request.

18. A server comprising:

a content database that stores resources in a plurality of site collections;

a configuration database that includes:

(i) data that indicate a site collection group associated with each of the site collections; and (ii) data that indicate a tier of helper services associated with each of the site collection groups, wherein a first tier of helper services associated with a first site collection group is specifically tailored to the first site collection group, and wherein at least one of the one or more helper services in the first tier of helper services comprises: blog management or wiki services;

a processor that executes:

(i) an instance of a web application that:

(a) receives a request associated with a resource in a first one of the site collections in the first site collection group;

(b) determines whether the first one of the site collections is associated with the first tier of helper services;

(c) uses a first helper service in the first tier of helper services to process the request;
(d) provides a site collection group management interface that enables a first entity to manage architectural aspects of the first site collection groups, wherein the site collection group management interface is implemented as a website within the first site collection group, the website including web pages having features enabling the first entity to manage the architectural aspects; and
(e) provides a site collection management interface that enables a second entity to manage content aspects of the first one of the site collections; and
(ii) a process that provides the first helper service, wherein the process that provides the first helper service cannot use data that is specific to a second one of the site collections to process the request without permission from an owner of the second one of the site collections.

19. The system of claim 18, wherein each of the site collections in the first site collection group is associated with different domain names.

20. The system of claim 18,
wherein the web application service provides the site collection group management interface as a website that comprises the site collection group management interface; and
wherein the web application service provides the site collection management interface as a website that comprises the site collection management interface.

* * * * *